No. 727,803. PATENTED MAY 12, 1903.
O. J. JORDAN.
MACHINE FOR CREMATING SPUTA.
APPLICATION FILED JULY 2, 1902.
NO MODEL.

Witnesses

Inventor
Orpah J. Jordan
By
Attorneys

No. 727,803. Patented May 12, 1903.

UNITED STATES PATENT OFFICE.

ORPAH JANE JORDAN, OF NEAR MONTICELLO, GEORGIA.

MACHINE FOR CREMATING SPUTA.

SPECIFICATION forming part of Letters Patent No. 727,803, dated May 12, 1903.

Application filed July 2, 1902. Serial No. 114,120. (No model.)

*To all whom it may concern:*

Be it known that I, ORPAH JANE JORDAN, a citizen of the United States, residing near Monticello, in the county of Jasper and State of Georgia, have invented certain new and useful Improvements in Apparatus for Cremating Sputa, of which the following is a specification.

The object of my invention is to provide a receptacle for expectorated sputa and to provide means for cremating the sputa in the receptacle and also for flushing or washing the receptacle. Such receptacles may be placed along streets or in buildings or on cars and be conveniently located in any of such places to permit persons to expectorate or spit into them.

The invention will be fully described hereinafter, reference being had to the accompanying drawings, which illustrate a preferred form of embodiment of my invention, and in which drawings—

Figure 1:
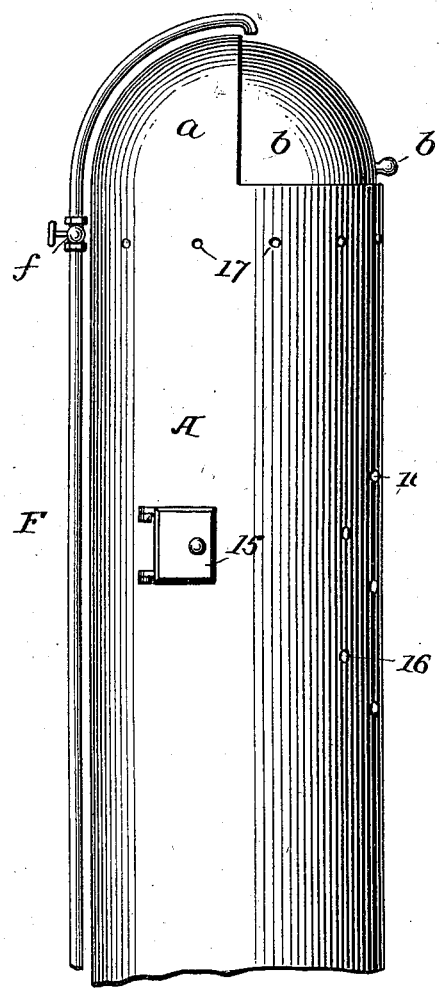
Figure 2:
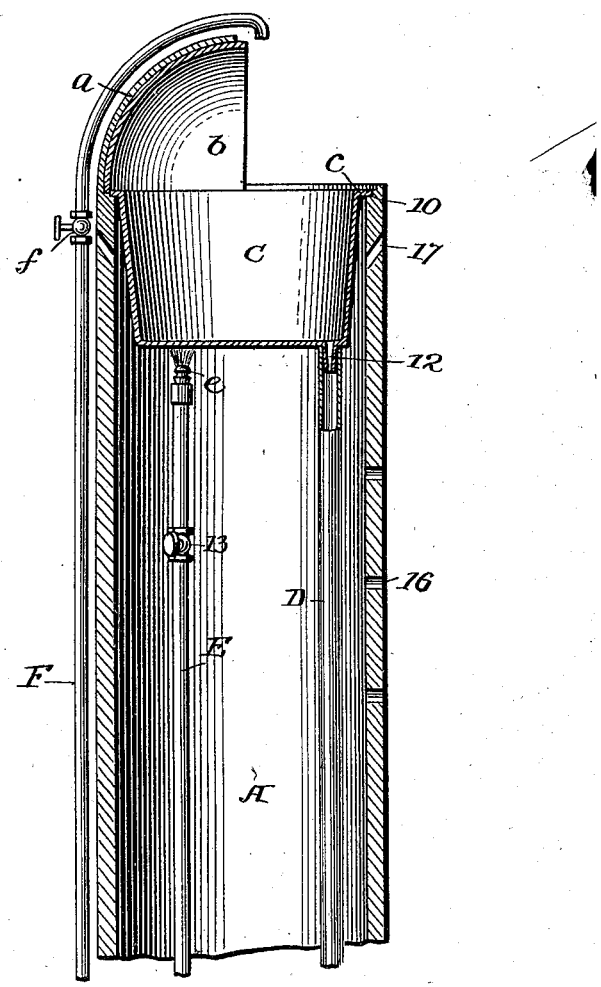

Figure 1 is an elevation of the complete apparatus, and Fig. 2 a vertical section of the same.

In carrying out my invention I provide a tubular casing A, which may be of terra-cotta or other suitable material, and which may have a hood or bonnet $a$ rigidly secured to it and covering about one-half of the upper open end of the casing A. Preferably a lid or cover $b$ will also be provided and be hinged or otherwise movably connected to the hood $a$ in order to cover the other half of the upper open end of the casing A when desired, and this lid is provided with a finger-hold $b'$ for convenience in moving it.

C is an open-topped vessel supported within the upper end of the casing A in any approved manner. Thus the vessel may have an annular horizontal flange $c$ to rest upon the annular shoulder 10, formed on the interior of the casing A. This vessel is designed to receive the sputa, and it will preferably be made of steel or similar metal and be provided with a short discharge-nozzle 12, leading out from the bottom near one side, and this nozzle will enter a pipe D, which latter will serve as a drain-pipe to carry off the contents of the vessel C.

Within the casing A is a pipe E, through which gas or other combustible fuel may be conveyed to a burner $e$ below the bottom of the vessel C, said pipe being provided with a cock 13. The casing A will be provided with a door 15 in its side opposite the burner to afford access to the latter. The casing A will also be provided with a series of holes 16 for admission of air to support combustion, and with another series of holes 17 near its upper end for the escape of the products of combustion, the latter holes preferably extending at an angle, as shown in Fig. 2.

F is a water-supply pipe extending up outside the casing and having its end curved to extend through the hood or bonnet $a$, so as to direct a stream of water into the vessel C for the purpose of flushing it. The pipe is provided with a valve $f$ for controlling the flow of water.

Having described the preferred form of construction of the apparatus, I will now describe the manner in which it may be used.

The burner will be lighted, and thus direct a flame onto the bottom of the vessel C, which will thus become highly heated, and any sputa expectorated into the vessel C will be cremated and any disease germs that may be present in the sputa will be destroyed. The parched or dried sediment accumulating in the vessel C can be washed away periodically through the drain-pipe D by opening the valve $f$ in the water-pipe F for a short time.

Without limiting myself to the precise details of construction illustrated and described, I claim—

1. In an apparatus for cremating sputa, the combination of a hollow casing open at its top, an open-topped vessel supported within the upper end of the casing to receive the sputa, a burner within the casing adjacent to the bottom of the vessel, means for supplying the burner with combustible fuel, and said casing having openings in its sides below the burner for admission of air and other openings above the burner for the escape of products of combustion, substantially as set forth.

2. In an apparatus for cremating sputa, the combination of a hollow casing open at its top, an open-topped vessel supported within the upper end of the casing to receive the sputa, and provided with a discharge-outlet in its bottom, means for delivering a stream of water into said vessel, a burner within the casing adjacent to the bottom of the vessel, means for supplying the burner with combustible fuel, and said casing having openings in its sides below the burner for admission of air and other openings above the burner for the escape of products of combustion, substantially as set forth.

3. In an apparatus for cremating sputa, the combination of a tubular casing provided with a bonnet or hood on its upper end and with a door in its side, an open-topped vessel supported in the upper end of the casing below the bonnet to receive the sputa, said vessel having a discharge-opening in its bottom, a burner supported within the casing below and adjacent to the bottom of the vessel, means for supplying combustible fuel to the burner, and means for delivering a stream of water into said vessel, substantially as set forth.

In testimony whereof I have signed my name to this specification, in the presence of two subscribing witnesses, this June 30, 1902.

ORPAH JANE JORDAN.

Witnesses:
HARVIE JORDAN,
ADIAL S. FLORENCE.